AUTOMATIC SHAPE CONTROL SYSTEM FOR BAR MIIL
Original Filed April 12, 1968 6 Sheets-Sheet 1
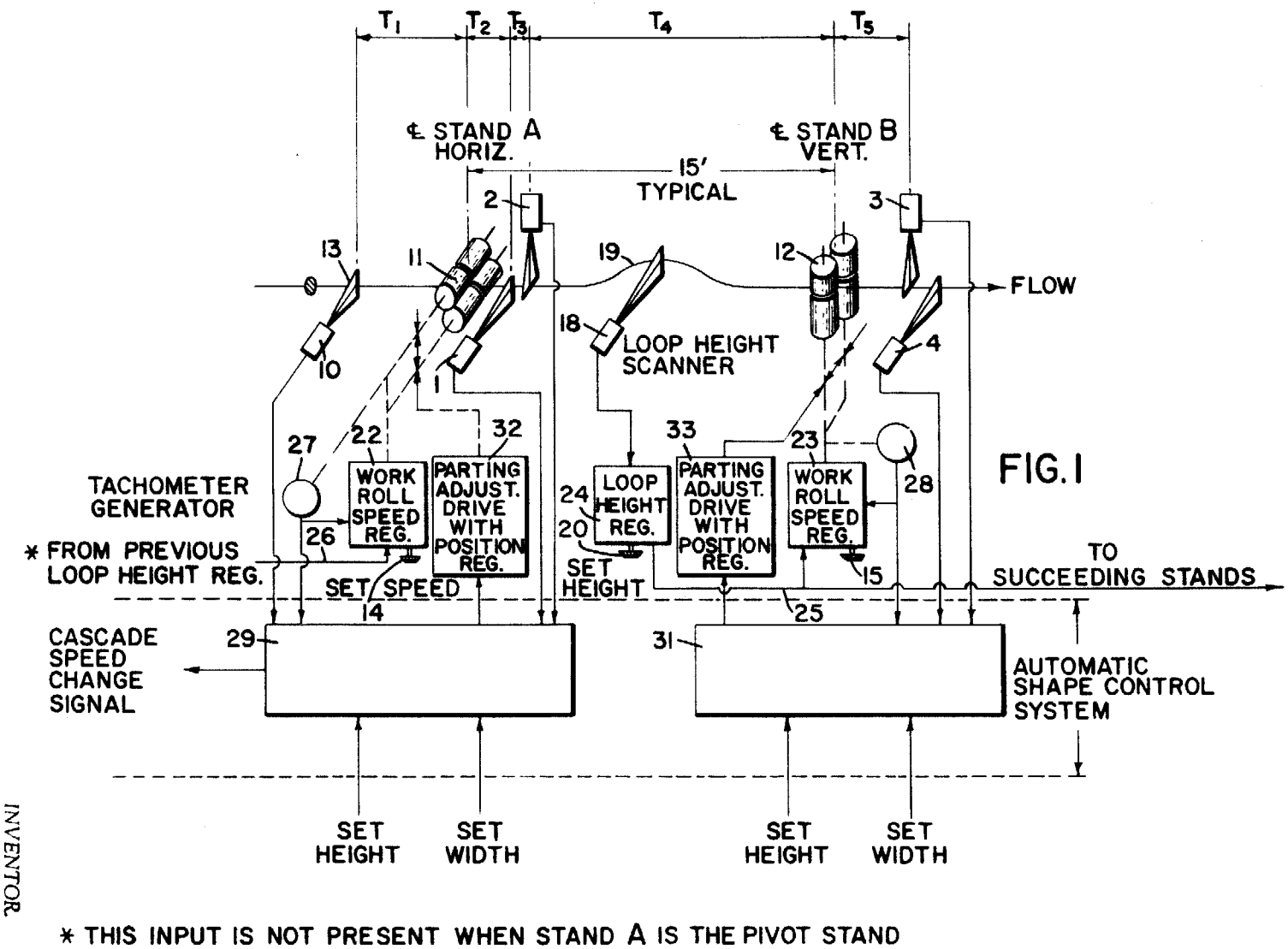
INVENTOR.
JOHN R. McNAUGHER
BY
ATTORNEYS

AUTOMATIC SHAPE CONTROL SYSTEM FOR BAR MIIL

Original Filed April 12, 1968 6 Sheets-Sheet 2

INVENTOR.
JOHN R. McNAUGHER
BY
Russell Chittick & Pfund
ATTORNEYS

AUTOMATIC SHAPE CONTROL SYSTEM FOR BAR MILL

Original Filed April 12, 1968 6 Sheets-Sheet 3

INVENTOR.
JOHN R. McNAUGHER
BY
Russell, Chittick & Pfund
ATTORNEYS

AUTOMATIC SHAPE CONTROL SYSTEM FOR BAR MILL

Original Filed April 12, 1968 6 Sheets-Sheet 4

INVENTOR.
JOHN R. McNAUGHER
BY
Russell, Chittick & Pfund
ATTORNEYS

AUTOMATIC SHAPE CONTROL SYSTEM FOR BAR MILL

Original Filed April 12, 1968 6 Sheets-Sheet 5

INVENTOR.
JOHN R. McNAUGHER
BY
ATTORNEYS

AUTOMATIC SHAPE CONTROL SYSTEM FOR BAR MILL

Original Filed April 12, 1968 6 Sheets-Sheet 6

INVENTOR.
JOHN R. McNAUGHER
BY
Russell, Chittick & Pfund
ATTORNEYS

United States Patent Office

Re. 27,370
Reissued May 16, 1972

27,370

AUTOMATIC SHAPE CONTROL SYSTEM FOR BAR MILL

John R. McNaugher, 39 Birchwood Drive, Holden, Mass. 01520

Original No. 3,526,113, dated Sept. 1, 1970, Ser. No. 720,892, Apr. 12, 1968. Application for reissue Nov. 16, 1970, Ser. No. 90,165
Int. Cl. B21b *37/00*
U.S. Cl. 72—8 19 Claims

Matter enclosed in heavy brackets [ ] appears in the original patent but forms no part of this reissue specification; matter printed in italics indicates the additions made by reissue.

ABSTRACT OF THE DISCLOSURE

A rolling mill for rods, bars and various shaped cross-sections has finishing stands with roll axes oriented ninety degrees (90°) relative to adjacent stands and automatic control of the rolling parameters to obtain precise transverse dimensions. Two transverse dimensions and the loop size between stands are sensed and use to control stand speed and roll separation in a feedback control loop while variables relating to stand loading and product characteristics are used to make supplementary or compensating adjustment. Further control signals are derived relating to mass flow to provide compatible adjustment of rolling parameters throughout the mill.

BACKGROUND OF THE INVENTION

The present invention relates to rolling mills for shaped product such as bar and rod mills and more particularly to such mills equipped with automatic controls for establishing predetermined rolling specifications for the product which passes through the mill with compensation and adjustment for all rolling variables automatically applied to selected rolling parameters of the mill.

Automatic control of continuous processes is well known and the application of such controls to metal rolling with respect to flat strip has been provided in the past. In mills which roll rod or bar with a substantial thickness dimension so that the cross-sectional shape requires control of two approximately normal transverse dimensions, the problem of satisfactorily controlling the various rolling parameters is complicated by the inter-dependence of the various parameters and properties of the rolling process. The most evident relation between the parameters results from the fact that when a bar is compressed in one dimension it tends to expand in the transverse dimension normal thereto.

BRIEF DESCRIPTION OF THE INVENTION

The rolling of a billet into an extended length of finished product inovlves passing through many roll stands. In the finishing stands the practice has generally been to provide adjacent stands with their roll axes oriented ninety degree (90°) relative to each other so that first one and then the other transverse dimension of the bar or rod is reduced and the consequent expansion of the non-reduced dimension provides the working dimension against which the next subsequent set of rolls operate. Experience has shown that a preferred schedule of transition, such as from round to oval to round and various intermediate shapes, usually exists for given product and rolling conditions. However, rolling conditions occur in which the desired reductions either cannot be taken or if taken produce adverse results respecting subsequent operations. Accordingly, the control system for a rod or bar product in accordance with the present invention provides an integrated control system capable of responding to a variety of different conditions.

In addition to the dimension setting of the roll separation, other factors affect the ultimate size of the product. One of the parameters which influence the rolling and ultimate size of the product is the inter-stand tension in the rod as it passes between adjacent stands. Generally, the product does not pass through the series of stands in the straight line but tends to form loops between stands which grow and shrink in accordance with the relative speed of the adjacent stands and the drafting forces which induce greater or lesser amounts of slip between the rolls and the product as the reduction is made. The management of this loop between stands requires guide rolls to direct the product into the next pass and the product is, accordingly, also influenced by the bends and guide pressures to which it is subjected between the stands. The present invention utilizes this loop to stabilize the rolling conditions and absorb transient unbalance amoung stands thereby permitting control changes to propagate through the mill without adversely affecting the product.

It is possible for rolling conditions to exist for which no adjustment of dimensional parameters can compensate and these conditions can be related to a mass flow anomaly. The present invention recognizes these conditions and selects the sequence of control application to correspond to a preferred program which includes alternate sequences to compensate for limiting conditions.

In addition to the primary control parameters which are available for adjustment in a rolling mill, a large number of variables enter into the process which are not readily controllable and which must be compensated for if the ultimate objective of maximizing the usable output product of the mill is to be realized. Thus changes in the rolling machinery due to heating, wear and other conditions of operation combine with changes in the temperature, density, uniformity and general metallurgical properties of the product being rolled to provided a complex interrelated set of variables over which no control can ordinorily be exercised. The continuous and automatic control of selected variables in accordance with the present invention provides a means for detecting and compensating for variations which would occur in the dimensions of the finished product as a result of all the rolling parameters and hence provides a means of achieving continuous production of the finished product to the desired tolerance in dimensions.

It is, accordingly, the principle object of the present invention to provide a rod or bar continuous rolling mill with automatic controls adapted to apply feedback control to and between the individual stands of the mill with the corresponding control of additional parameters to permit the inter-related effect of adjustments in individual stands to be accomplished without upsetting the operation of the system as a whole. In furtherance of this principle object. the present invention provides a coordinated system of parameter controls and variable sensing which can be utilized in various degrees of completeness to achieve any desired level of precision in rolling a shaped product.

In the drawings:

FIG. 1 is a schematic representation of two adjacent finishing roll stands in a bar rolling mill with sensing and control devices indicated generally;

FIGS. 2A and 2B taken together show a control function diagram representing the inter-connection of various sensors and control elements in providing feedback control for the two stands shown in FIG. 1; and with concurrent and anticipatory control systems;

DESCRIPTION OF THE PREFERRED EMBODIMENT

Figure 2A:
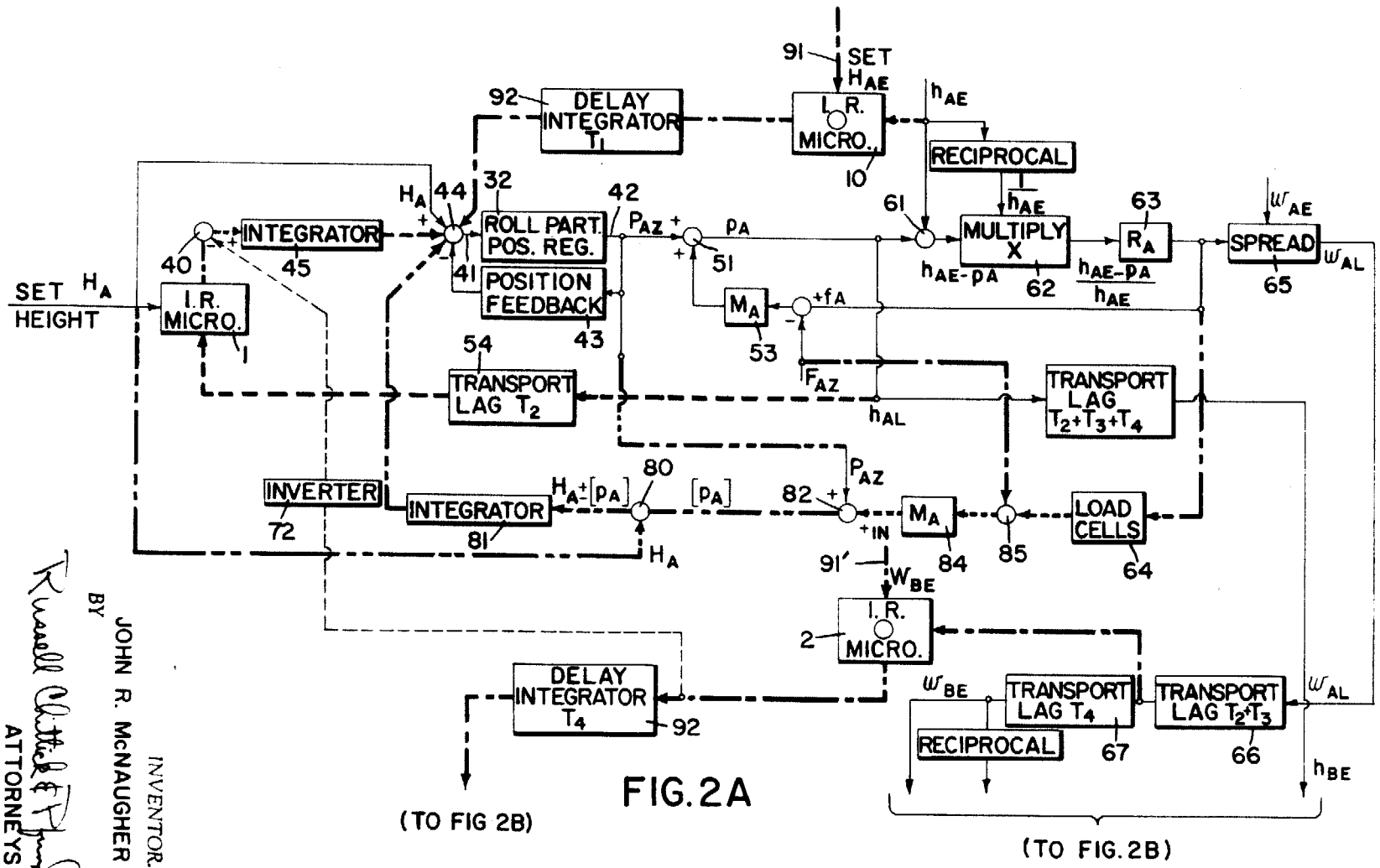

Referring now to FIG. 1, a portion of a rolling mill representing two adjacent finishing stands A and B provides for reducing the transverse dimensions of product 13 which runs through the passline in the direction indicated. The stand A has horizontal rolls 11 adjustable to compress the height dimension of the product passing therethrough while the stand B has vertical rolls 12 adjustable to compress the width dimension of the strand passing therethrough.

In order to accomplish the objectives of the present invention it is desirable that the stands of the rolling mill have dynamic characteristics which permit the various adjustments to be made under rolling load conditions. Thus adjustment of the separation of the rolls in a given stand needs to be accomplished while the product is passing therethrough and against the normal separation forces which the product exerts against the rolls. It is also preferable that the parting of the rolls to define the passline be accomplished symmetrically so the center line of the pass remains substantially fixed in space. The adjustment of the roll separation should be controlled by high-performance position regulators which provide rapid and accurate but non-oscillatory response to control signals and the mechanical portion of the system should have a minimum of backlash in order that both positive and negative increments in roll separation can be achieved with equal facility. Finally, the speed of the stand requires good control and rapid response since the parameters which are being adjusted can affect the speed and conversely the speed can be employed to modify certain of the control parameters that are utilized.

Many modern roll stand employing various types of parting adjusting mechanisms such as eccentrics, wedges and screws can be used for the present invention. One such housing adaptable for power operation is shown, for example, in U.S. Pat. No. 3,172,314. Various drive means in the form of electric or hydraulic operating mechanisms can be employed to achieve the desired response. Accordingly, the principles of the present invention are not to be considered as limited to any particular type of roll stand or position control regulator but can be applied to any mill components having suitable operating characteristics for achieving the performance required by the particular installation.

Associated with stand A are two transverse dimension-sensing devices indicating as infrared micrometers 1 and 2. These sensors may be of the type produced by the Barnes Engineering Co. Model No. St–1. The infrared micrometers 1 and 2 scan the hot product 13 and produce a signal representative of the transverse dimension scanned Thus the sensor 1 produces a signal representative of the height dimension and the sensor 2 produces a signal representative of the width dimension of the product emerging from rolls 11.

Similarly stand B has two sensors 3 and 4 which produce output signals representative of the width and height respectively of the rod issuing from rolls 12. It will be noted that the position of the sensors permits the primary sensor in each case to be closest adjacent the rolls where the primary sensor is understood to mean the device which measures the dimension which is reduced by the particular rolling stand. Thus the transport lag in the control system between the point where the dimension is measured and the point where the measured dimension can be controlled by the immediately preceding rolls is minimized.

A loop height sensing device 18 is provided between the roll stands A and B for sensing the height of a loop 19 which forms in the product between the stands 11 and 12. The sensor 18 may be, for example, an ASEA Electric, Inc. non-contacting system consisting of a QGLF–104 scanner with a QGLX–101 converter which responds to the position of the loop 19 within the field of scan to produce an error signal relative to a preset established height location for the loop 19.

The rolls in stand A and stand B are each individually driven in rotation to make a reduction in the cross-section of the strand passing therethrough. For this purpose the drives for the rolls are controlled by individual work roll speed regulators 22 and 23 which are responsive to input control signals to establish the rotational speed of the rolls 11 and 12 respectively. The roll speed is determined in accordance with the rolling schedule and controlled either manually by controls 14 and 15 or by signals from a loop height regulator such as regulator 24 preceding a particular stand which is responsive to the error signal from the loop height scanner 18. The output signal from the loop height regulator 24 is applied on line 25 to the work roll speed regulator 23 and to succeeding downstreams stands with appropriate scale factor. A similar control signal may be applied on line 26 to the work roll speed regulator 22, the signal for which is derived from the loop height regulator and scanner preceding stand A. Generally a manually set loop height will be set by control 20 and thereafter the loop height regulator 24 supplies speed control signals to the speed regulator 23 downstream from the loop 19 to maintain the loop height constant.

In any mill one stand is usually selected as the "pivot stand" which means that it serves as a reference for setting the relative speeds of the remaining stands. The present description will proceed on the basis of stand A serving this function and being located as the first stand in the finishing section of the rolling mill. With stand A serving as the pivot stand, there will be no loop height regulator signal 26 working into the stand A speed regulator 22. It will be understood that the invention is not limited to application at this point in the mill, however, but rather that the controls provided herein can be applied at any location as desired subject to the requirement for sensors such as 18 to maintain interstand speed relationships when disturbances are introduced by the automatic adjustment of parting.

Since roll speed is one of the variables that is controlled in accordance with the present invention tachometer generators 27 and 28 are used to derive signals representative of roll speed, which signals are applied to the automatic shape control system 29 and 31, which will be more fully described hereinafter. Additional inputs to the shape control systems 29 and 31 are derived from the infrared micrometers 1 and 2 and the micrometers 3 and 4. The automatic shape control system 29 operates to provide a signal to a parting adjustment drive and position regulator 32 which operates to establish and maintain a desired separation between the rolls 11 in accordance with the various functions computed by the automatic shape control system 29. Similarly the shape control system 31 supplies a signal to the parting adjustment drive and position regulator 33 which establishes and maintains a desired separation between the vertical rolls 12.

Figure 2B:
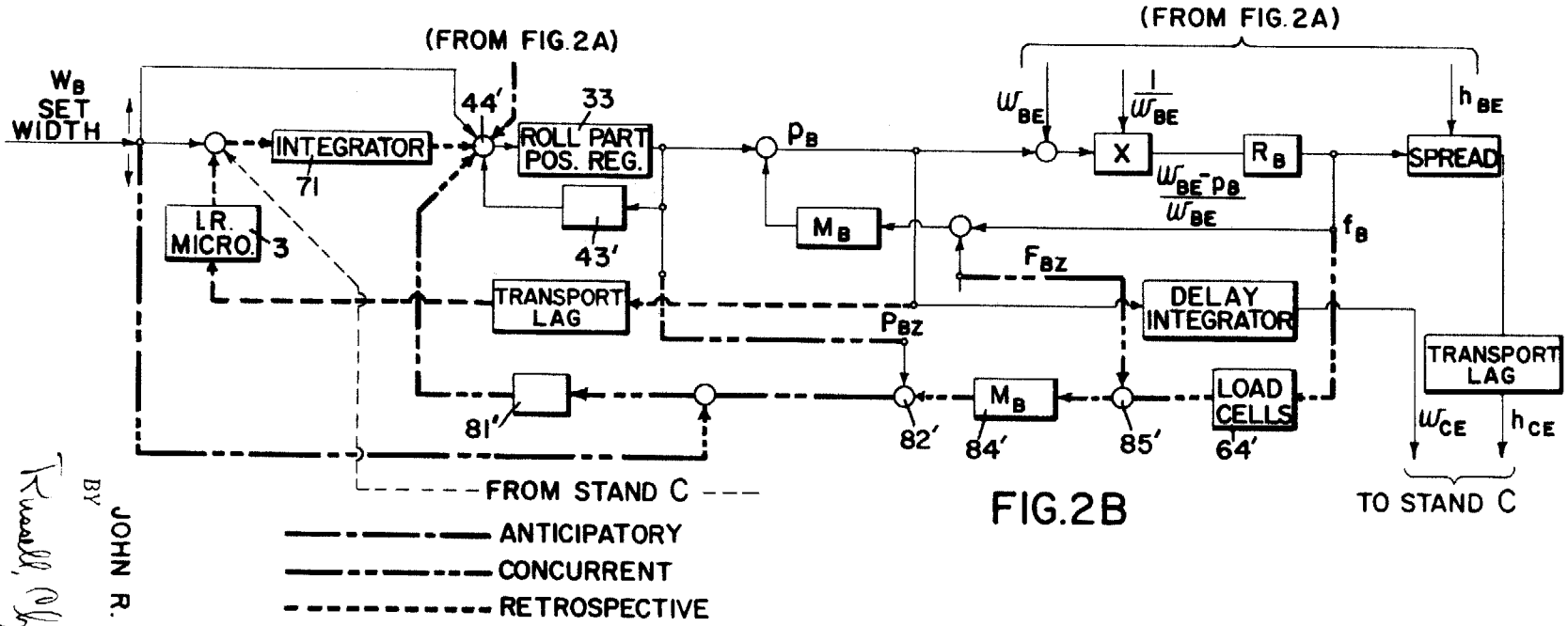

Referring now to FIG. 2, the feedback control system of the present invention will be described. The diagram in FIG. 2 is a control function diagram representing the automatic shape control systems 29 and 31 as they operate to supply the signals to the parting adjustment drive and position regulators 32 and 33. Thus FIG. 2 represents the signal quantities and physical dimensions and stresses which exist or are applied to or derived from the roll stand and the various control system elements which are associated therewith. The actual sequence of product through the mill is not shown in FIG. 2 but rather is shown in FIG. 1. The relative location shown in FIG. 1 for the rolls, sensor, loop height scanner, etc. is to be understood for the corresponding sensor and control elements shown in FIG. 2. FIG. 2 will first be described only with respect to the feedback control system and subsequently the inputs and control signals for the concurrent and anticipatory control systems will be described. These various control systems are represented by signal paths having different coded lines as given on the legend accompanying FIG. 2.

The variables indicated on FIG. 2 are defined in the table below where it will be noted that certain quantities are inherent or implicit in the mill itself rather than representing physical structure.

$F_{AZ}$—Roll force (#) at which stand "A" parting position regulator was zeroed.
$F_{BZ}$—Roll force (#) at which stand "B" parting position regulator was zeroed.
$f_A$—Instantaneous roll force on stand "A" (#)
$f_B$—Instantaneous roll force on stand "B" (#)
$H_A$—Set (or desired) height of section delivering from stand "A" (inches)
$h_{AE}$—Actual section height entering stand "A" (inches)
$h_{AL}$—Actual section height leaving stand "A" (inches)
$h_{BE}$—Actual section height entering stand "B" (inches)
$h_{BL}$—Actual section height leaving stand "B" (inches)
$M_A$—Spring constant of housing, bearings and rolls of stand "A" (in./#)
$M_B$—Spring constant of housing, bearings and rolls of stand "B" (in./#)
$P_{AZ}$—Equivalent roll parting of stand "A" at roll force used for zeroing
$P_{BZ}$—Equivalent roll parting of stand "B" at roll force used for zeroing
$p_A$—Instantaneous parting of stand "A" (inches)
$p_B$—Instantaneous parting of stand "B" (inches)
$R_A$—Resistance to deformation $$\left(\frac{\#}{\text{Percent Reduction}}\right)$$

of stand "A"
$R_b$—Resistance of deformation $$\left(\frac{\#}{\text{Percent Reduction}}\right)$$

of stand "B"
T—Various transport lag times (seconds)
$W_B$—Set (or desired) width of section delivering from stand "B" (inches)
$w_{AE}$—Actual section width entering stand "A" (inches)
$w_{AL}$—Actual section width leaving stand "A" (inches)
$w_{BE}$—Actual section width entering stand "B" (inches)
$w_{BL}$—Actual section width leaving stand "B" (inches)

The parting adjustment position regulator 32 operates from an error signal on line 41 to produce an equivalent roll parting $P_{AZ}$ from which a position feedback signal is applied through position feedack 43 to a signal adder 44. This error signal represents the difference between the position reference signal from an integrator 45 and the other inputs to adder 44 including the signal from position feedback 43. The description of the integrator 45 will be given in detail hereinafter with reference to FIG. 3.

The input to the infrared micrometer 1 is the actual height dimension of the product emanating from the rolls 11, the separation of which is controlled by the position regulator 32. In terms of the diagram of FIG. 2, this optical input to the micrometer 1 is represented as the output $P_{AZ}$ (the preloaded roll parting for rolls 11) from the position regulator 32, to which has been added in adder 51 the deflection representing the product in multiplier 53 of the mill modulus $M_A$ and the increment in actual mill loading $f_A$ relative to $F_{AZ}$, the roll force at which the parting position regulator was zeroed. The sum $p_A$ produced by adding in adder 51 the two terms $P_{AZ}$ and the product $M_A$ ($F_{AZ}$—$f_A$) is the actual parting dimension for the rolls 11. This actual parting corresponds to the height dimension of the rod emanating from rolls 11 and when delayed by the actual transport lag between the reducing position between rolls 11 and the location of the infrared micrometer 1, represented at 54, is the dimension instantaneously sensed by the micrometer 1.

This dimension is compared with the set height to produce a deviation signal applied to adder 40. The output of adder 40 is integrated by integrator amplifier 45 to compensate for the transportation lag. The output of integrator 45 is applied as an input to the adder 44 as previously stated. This signal sequence closes the retrospective feedback loop operating to control the roll parting of stand A.

The physical input to the rolls 11 of stand A is the product 13 having an initial height dimension $h_{AE}$ which is processed by the rolls 11 as determined by their actual parting $p_a$ through the functional steps represented by the difference of these two quantities at 61. The reciprocal of the quantity $h_{AE}$ multiplied by $h_{AE}$ —$p_A$), as represented in multiplier 62, corresponds to the percentage reduction $$\frac{h_{AE}-p_A}{h_{AE}}$$

This percentage reduction and the resultant force $f_A$ are functionally related depending on the resistance to deformation $R_A$ involved in the process step for stand A. The quantity $f_A$ can be sensed by load cells 64 associated with the rolls 11 to obtain an analog of $f_A$ which quantity is used in connection with the concurrent control system hereinafter described.

The application of the force $f_A$ to the incoming material resulting from the percent reduction $$\frac{h_{AE}-p_A}{h_{AE}}$$

produces a corresponding change in the transverse dimension on the rod normal to the direction of the applied force. This quantity, the spread, represented by functional block 65, changes the entering width dimension, $w_{AE}$, to rolls 11 into the quantity $w_{AL}$, the width leaving the rolls 11. This aquantity $w_{AL}$ appears after the actual transport lag 66 required to reach the infrared micrometer 2 and after additional actual transport lag 67, as the actual quantity $w_{BE}$, the width dimension entering stand B.

It should be noted that the quantities $R_A$ and the spread represented by the funcitonal blocks 63 and 65 respectively represented by the functions of multiple variables such as temperature, composition, tension, velocity and shape factor (i.e. rolling round to oval and vice versa).

In stand B a set of controls comparable to those just described for stand A is acting against the width dimension relative to the width of the product sensed by the infrared micrometer 3 located just following the output side of the rolls 12. Thus the quantity $w_B$ is set to the desired width to be delivered from stand B and this signal combined with the measured quantity obtained from micrometer 3 provides an input for integrator 71. The integrator 71 provides an output signal which is applied to adder 44' to control the actual roll parting dimension of roll parting position regulator 33 with feedback through position feedback 43' to adder 44'. By the operation of stand B, the input dimension $w_{BE}$ is converted by the actual roll parting $p_B$ to produce the output variables for the next subsequent stand, namely, $w_{CE}$ the width of the product entering stand C and the quantity $h_{CE}$ the height of the product entering stand C.

Figure 6:
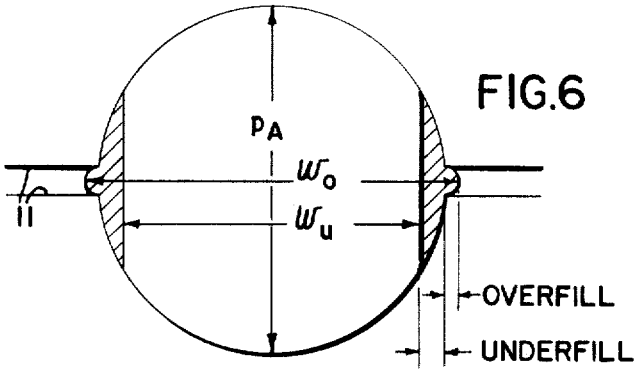
FIG. 6 is a cross-sectional diagram representing the range of dimensions transverse to the dimension reduced in a rolling stand for the product in process.

Referring now to FIG. 6, the cross-section of the roll pass is indicated for a pair of horizontal rolls 11. The passline opening is defined as the width between the deepest part of the groove in the work rolls 11 as shown by the dimension $p_A$ in FIG. 5. The rolling schedule is designed and optimum operating conditions obtained when the passline is just filled, i.e., with no overfill or underfill. The less than optimum conditions for which corrections are applied by the present invention are indicated in FIG. 6 by the two sets of transverse dimension $w_0$ and $w_u$. When overfill or underfill conditions are present it may be desirable to take a modified reduction in the height dimension to compensate for the width dimension. For example, in the early stands of a finishing mill it may be easier to handle the product if it is rolled with a slightly greater height reduction in order to compensate for a severe underfill condition and conversely when an overfill condition exists it may be advantageous to take less than the specification reduction in the height dimension. For this purpose the system of FIG. 2 provides for an additional input to the adder 40 from the output of the infrared micrometer 2 which signal after inversion in inverter 72 is applied with the height signals summed in the summer 40 to develop the control signal for the position regulator 32. Since an overfill condition will produce from infrared micrometer 2 a signal normally calling for a decrease in the parting of the width rolls 12, its inversion in inverter 72 will produce a signal which will call for an increase in the parting of the height rolls 11. With greater separation of the height rolls 11 the overfill condition producing error signal output of micrometer 2 will be made less acute at the expense of some error in the rolling of the height specification in the rolls 11. However, as previously stated this compromise may result in a better shape factor for the product as it enters the subsequent stands of the mill and as the product progresses through the finishing stands its approach to on-specification dimensions in both height and width its achieved as a limiting condition.

For certain types of off-gauge product conditions the present invention optionally provides a concurrent control system which makes adjustments for present rolling conditions. In particular where high-speed transients occur as the product passes through the stand, a concurrent regulator makes corrections which are achieved faster than those which include a transportation lag. For this purpose the system as shown in FIG. 2 provides in stand A for the set height $H_A$ to be combined with the factor $\pm[p_A]$ representing the calculated actual instantaneous parting of the rolls 11. These terms are added in adder 80 and compared differentially with the input $H_A$ in the summing device 44. The quantity $H_A \pm [p_A]$ is integrated or averaged in integrator 81 and the corrective output from the comparison device 44 applies a superposed control signal on the position regulator 32. When the calculated actual instantaneous parting $[p_A]$ is equal to $H_A$ the input from this control system is zero and the desired roll separation in the presence of the transient disturbance has been achieved.

For this purpose of calculating $[p_A]$ a signal $P_{AZ}$ representing the equivalent roll parting at the roll force used for zeroing the mill is applied to an adder 82. The variable input to mill modulus multiplier 84 is obtained from an adder 85 which has as inputs $F_{AZ}$, the preloaded roll force on rolls 11, and the actual load force derived from load cells 64. Thus the net difference from the preloaded load force and that detected by the load cells is combined with the preset separation and mill modulus to produce the calculated instantaneous parting resulting from the existing load as measured at the rolls according to the equation:

$$[p_A]=P_{AZ}+M_A(P_{AZ})(f_A-F_{AZ})$$

where $M_A(P_{AZ})$ is understood to mean the mill modulus function $M_A$ evaluated at $P_{AZ}$.

If the calculation indicates that the calculated parting will be different than the actual roll parting desired for the product, the corresponding parting adjustment is made to compensate for the deflection increment which the current load values reflect into the actual roll separation.

An analogous concurrent correction control system is provided for the width dimension reduced by stand B. For this purpose corresponding parts are given corresponding numbers but primed to indicate that the width dimension is controlled rather than the height dimension as in stand A. Thus load cell 64' supplies an electrical signal to adder 85' representative of the actual separating force applied to the rolls 12. The zeroing force $F_{BZ}$ is also applied to the adder 85' and the difference between the two input signals is supplied as one input to a mill modulus multiplier 84'. The adder 82' produces the signal $[p_B]$ which is the calculated instantaneous parting required under the present measured load conditions and this value is applied through averaging integrator 81' as an input to the combining circuit 44'.

Another optional control system provided by the present invention utilizes measurements of anomalies in the stock 13 measured prior to their entrance into their respective rolls 11 and 12 to make an anticipatory correction for dimension or other property differences sensed with the correction being applied at the time the anomaly reaches the pass between the approprate rolls. For this purpose stand A has a set height input $H_{AE}$, the desired entry height of the stock 13, shown at 91 and the actual height $h_{AE}$ which is entering stand A which are compared by an infrared micrometer 10 located just prior to the rolls 11. This comparison signal is applied to delay integrator 92 which provides a transport lag or time delay in its output signal which is applied to the adder 44 for making an adjustment in the separation of the rolls 11. The delay introduced by integrator 92 corresponds to the time taken for the anomaly sensed to reach the pass between rolls 11.

A corresponding anticipatory control system is applied to stand B with corresponding elements represented by the same numbers primed as described with reference to stand A. Thus the set entry width $W_{BE}$ is set at 91'. Infrared micrometer 2 serves to compare the input stock width to the rolls 12 with $W_{BE}$ and delay integrator 92' generates the control input signal to combiner 44' to give the appropriate change in the separation of the rolls 12 when the detected anomaly reaches the pass therebetween.

Figure 3:
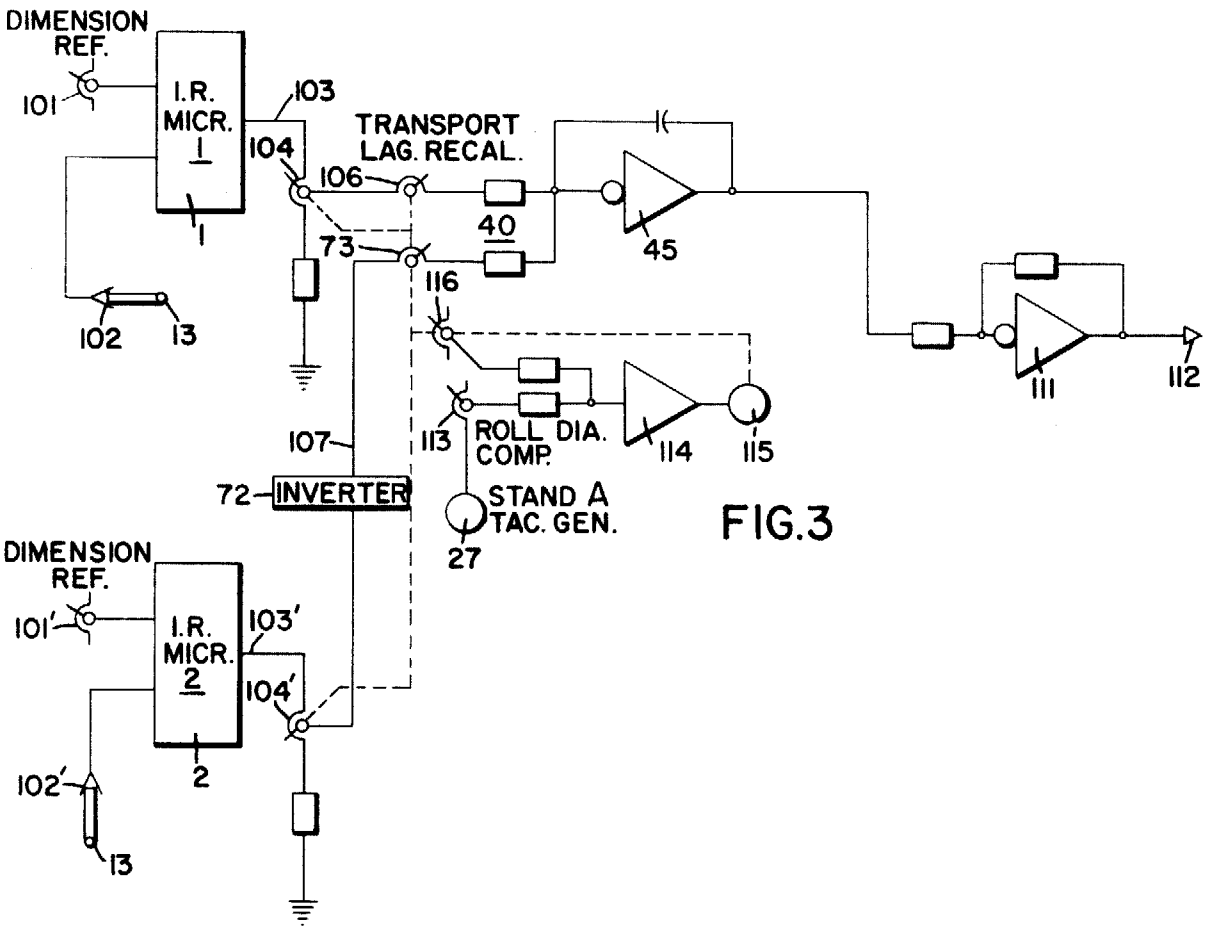
FIG. 3 is a control amplifier diagram for a portion of the elements shown in FIGS. 2A and 2B.

A control amplifier such as used in the present invention is illustrated schematically in FIG. 3. The height controller 45 is shown and comprises the infrared micrometer 1 having an input adjustment 101 for setting $H_A$. A scanner 102 detects the height dimension of the product 13 and the comparison of the two signals from 101 and 102 produces an error signal on line 103 representing the magnitude and sense of the difference between the set height and actual height dimension of the product 13 emerging from the rolls 11. This signal is calibrated in amplitude by means of potentiometer 104 and appears as one input to the integrating amplifier 45. The signal passes through an adjustable time constant resistor 106 which provides for transport lag compensation. By means of the adjustment 106 the integration time of integrator 45 can be adjusted to correspond to the transport lag.

A second input to the integrator 45 is derived on line 107 from the output of the infrared micrometer 2 which corresponds to the deviation in width of the product 13 as it emerges from stand A relative to the set width $W_{BE}$. The signal from line 107 passes through an adjustable resistor 73 which provides for transport lag compensation and is combined in the adding circuit 40 to provide the input for the integrator 45.

The output of the integrator 45 is applied to an operational amplifier 111 which supplies an output signal at terminal 112 that maintains the last established parting position for the rolls 11 as determined by the input signal to amplifier 111.

The roll separation signals are calibrated in accordance with the stand speed and for this purpose the tachometer 27 on stand A generates an electrical signal representative of the rotational speed of the rolls 11 which can be calibrated in amplitude by ptoentiometer 113 and applied as one input to a servo amplifier 114. The output of the servo amplifier 114 drives the position motor 115 which adjusts a potentiometer 116 which supplies a null input to the amplifier 114 thereby making the adjustment of the motor 15 representative of the stand speed detected by tachometer 27. The same adjusted position of motor 115 is used to adjust potentiometers 73, 104, 104' and 106 to calibrate the input signals to the adding circuit 40 according to th espeed of the rolls 11. The roll parting will be adjusted to compensate for speed changes and the known effect it has on reduction of product dimensions in passing through the stand. Analogous controllers for the remaining stands regulate the height or width separation of the rolls. As many stands may be automatically controlled as is deemed necessary in a given mill installation.

The signal on line 107 is derived from micrometer 2 which has a potentiometer 101' to set the value of $W_B$ for the desired width of the product emanating from rolls 11. An infrared scanner 102' measures the width dimension of the product 13 associated wiith micrometer 2 and the error signal on line 103' represents the difference relative to the set width signal from potentiometer 101'. The signal on line 103' is applied to a speed calibration potentiometer 104' and through inverter 72 to line 107 as previously described. The potentiometer 104' is adjusted for speed changes of stand A by coupling to the servo position motor 115.

The foregoing described control system for the finishing stands of a mill provide compensation within limits for substantially all known variations which can occur. Under some conditions of operation the dimensional deviations from the desired values can become of such magnitude and combinations of height and width variations can occur such that a basic adjustment of the mass flow rate of the mill is necessary in order to provide the proper environment for the application of controls. When mass flow rate needs to be corrected it is essential that the correction be obtained without introducing disruptive effects which propagate through the mill and cause difficulties with respect to maintaining tolerance of rolled dimensions. For this purpose the present invention uses a cascade speed control system and integrates it with the dimensional controls previously described, such that when in use this combination of controls can provide mass flow adjustment prior to the application of roll parting corrections in the finishing mill to achieve on-specification product.

Mass flow error occurs whenever a primary reduction change by a set of rolls induces a transverse change which is not in the direction to make the transverse dimension more nearly equal to the desired dimensions set at that particular point in the finishing stand for that dimension. As a practical matter this means that there are only three conditions under which the roll parting adjustments previously described are free to operate without mass flow corrections in the preceding roughing and intermediate stands of the mill. These three conditions are for both the height and width to be on-specification or for both the height and width to be off-specification with one dimension error being positive and the other being negative. For any other condition such as one dimension on-specification and the other dimension off-specification a change in the roll parting to bring the other dimension to on-specification will result in the other dimension going off-specification and similarly where both dimensions are off-specification in the same sense, i.e., both over-specification or both under-specification, no amount of correction of one dimension will aid the error in the other dimension. Thus for six conditions of rolling dimensions an increase of mass flow or a decrease of mass flow is indicated. The following table shows the relation between the variables where the width dimension and the height dimension are represented by plus if too large, equal if on-specification and minus if too small. The arrows pointing downward indicate the mass flow must be decreased before roll parting dimension changes can be used, while the arrows pointing up indicate that an increase in mass flow must be made. The three boxes having zero designation indicate that mass flow is correct and roll parting corrections can be relied upon to bring the product to specification.

TABLE I

| | W | | |
|---|---|---|---|
| H | + | = | − |
| + | ↓ | ↓ | 0 |
| = | ↓ | 0 | ↑ |
| − | 0 | ↑ | ↑ |

Figure 4:
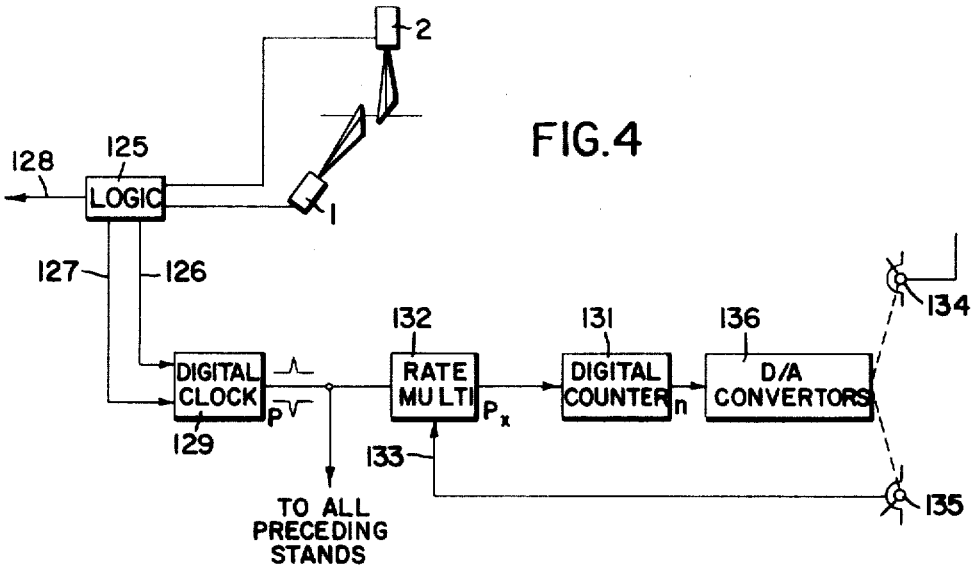
FIG. 4 is a block diagram of a digital servo device useful in obtaining precision cascade speed control.

FIG. 4 shows a digital servo operable in response to signals from micrometers 1 and 2 to generate cascade speed control signals for the roughing mill in accordance with the conditions represented in Table I. Thus micrometers 1 and 2 supply positive and negative signals to a logic unit 125 which senses the combinations of plus and minus signals represented in Table 1 to produce cascade up signals on line 126 and cascade down signals on line 127 when speed changes to increase or decrease the mass flow respectively are required. When cascade up or down signals appear on lines 126 or 127 the logic unit 125 also provides a disabling signal on line 128 which may be applied to prevent roll parting adjustments and speed changes from taking place in the finishing stand during the cascade adjustment of the roughing mill.

The cascade control signals actuate a digital clock 129 to supply counting pulses at a constant rate and of polarity to cause a digital counter 131 to count up or down depending upon whether the cascade speed control is up or down. The pulses from the digital clock occur only during a cascade up or down interval and pass through a rate multiplier 132 which has an input control 133 which is adjustable to pass a variable percentage of the pulses from digital clock 129 to the digital counter 131. The setting of the control 133 and hence the percentage of pulses passed by the rate multiplier 132 is determined by the speed of the particular stand as represented by the adjustment of rheostat 135. This adjustment is ganged with a signal source, represented by rheostat 134, both of which are indicated as operated by a digital servo unit consisting of counter 131 and digital to analog converter 136. The digital servo unit controls stand speed corresponding to the count which remains in the counter 131 after each sequence of cascade pulses from the digital clock is passed thereto through the rate multiplier 132. Since the control 135 changes the proportion of the pulses from the digital clock passed to the digital counter in accordance with the actual speed of the stand controlled by the digital servo 136, a higher percentage of the pulses will be passed for the higher speed settings of the control 134. This is the condition necessary to obtain an exponential speed relationship in which the rate at which the speed is changing is proportional to the actual speed at which the stand is running. When this type of control is applied to the successive stands in a rolling mill the speed changes can be calibrated to correspond to the same mass flow change in each stand thereby maintaining the entire roughing and intermediate mill in equilibrium operation even thoough the mass flow changes substantially. The mathematical representation of this cascaded speed control is given as follows:

$$s = K_2 n$$

or, taking the derivative, $$\frac{ds}{dt} = K_2 \frac{dn}{dt}$$

but, $$\frac{dn}{dt}=Px$$

therefore, $$\frac{ds}{dt}=K_2Px$$

however, x varies linearly with s or, $$x=K_3s$$

so, $$\frac{ds}{dt}=K_2PK_3s \qquad \left[\frac{ds}{dt}=K_2PK^3s\right]$$

or, $$\frac{ds}{s}=K_2K_3Pdt$$

and integration gives:

$$[\ln s=K_2K_3Pt+C]\ \ln s=K_2K_3PT+C$$

setting $K_2K_3P=K_1$, we get the desired exponential which is:

$$[e(K_1t+C)=s]\ e^{(K_1t+C)}=s$$

where:
$K_2$=constant
n=count in digital counter 131
x=setting of rate multiplier (percent)
[p]$P$=pulse rate from digital clock (pulses/sec)
$K_3$=constant
s=motor speed (r.p.m.)
t=time (sec)
C=constant of integration Referring now to FIG. 5, which shows the motor speed control diagram for a number of stands in the roughing mill, a typical stand designated A—x will be described. Each stand includes a drive motor 141 for the rolls of the roughing stand. The motor 141 has a shunt field winding 142 for speed control in response to current from an exciter 143. The exciter 143 is controlled by a speed regulator 144 which responds to input signals from the potentiometer 134 of the digital servo unit of FIG. 4 which is represented as stand speed servo 145 in FIG. 5. The speed regulator 144 receives tachometer signals from a tachometer 146 to close the feedback servo loop regulating the speed of the motor 141. The stand speed servo 145 may operate an additional rheostat 147 to provide automatic selection of the optimum voltage at which to operate the rectifier armature supply to the mill motors by sensing on line 148 a requirement to operate below rated voltage.

Figure 5:
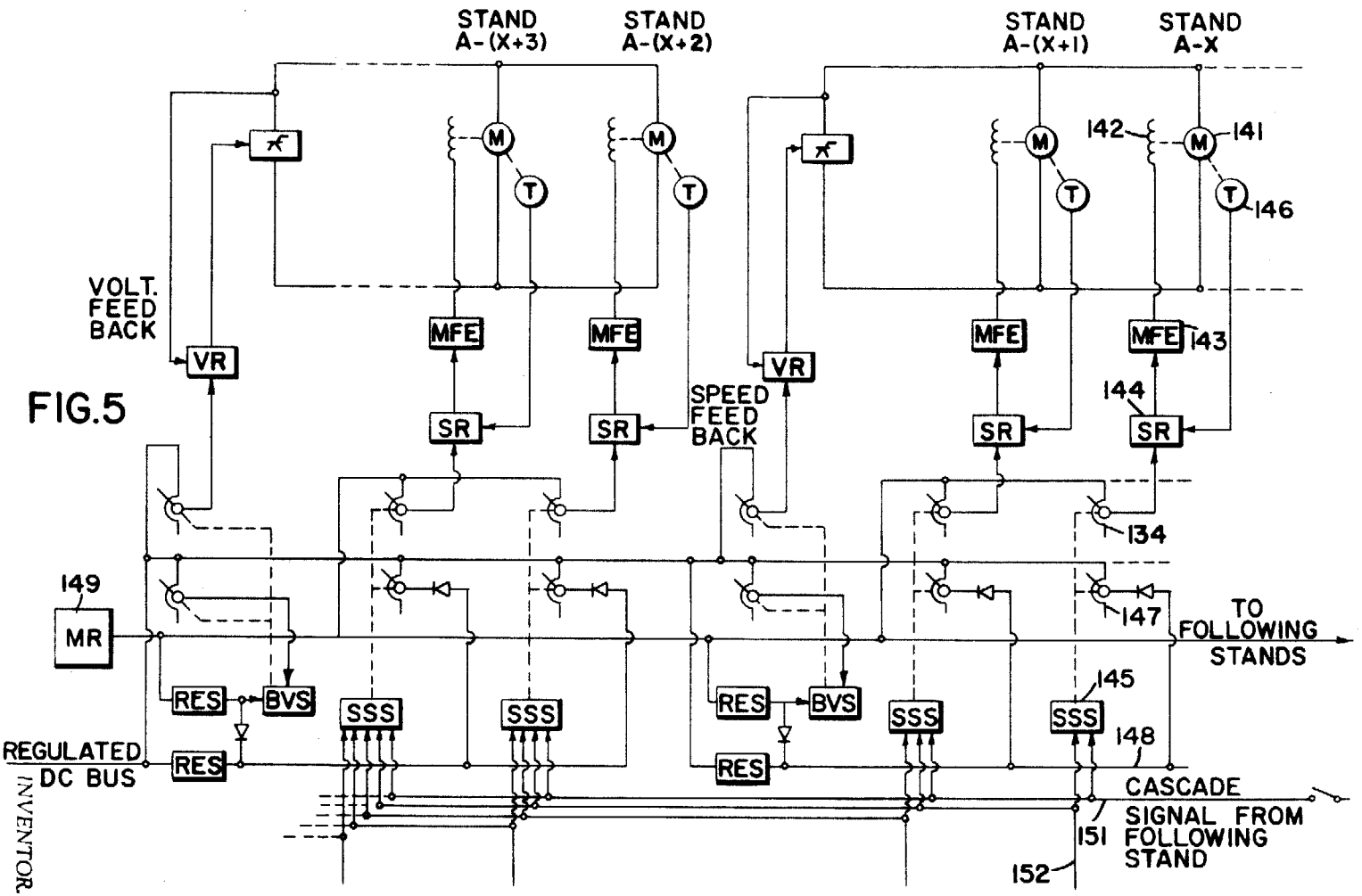
FIG. 5 is a control diagram for a roughing mill representing the application of cascade speed control.

The up and down cascade signals to the digital clock 129 represented in FIG. 4 are incoming on line 151 in FIG. 5 and are applied to each of the stand speed servos 145 for each of the upstream stands of the roughing mill as indicated. Each of the stand speed servos 145 also has a manual cascade input signal line 152 with the manual speed change also being applied to all the upstream stands so that any change which occurs in a stand (A—x) by application of signals to the stand speed servo 145 produces a corresponding percentage speed change in the upstream stands as a result of the action of the rate multiplier and digital servo combination described with respect to FIG. 4 which is understood to be present in each of the blocks designated SSS in FIG. 5. In addition, each stand speed servo can be manually set to any position independent of the other servos 145.

Existing cascade speed control systems are designed to sense limit speed conditions for the stand motors and, upon detection of a limit, freeze the speed of the stands to then existing values. As used in the present invention a limit condition automatically terminates the speed change and speed changes in the opposite direction are applied to the stands in the finishing mill, such as stands A and B shown in FIG. 1, to change the mass flow through the finishing mill to a point where the speed range of the motors 141 is within the allowable limits for the roughing mill. Limit conditions are automatically accounted for in the operation of the system which will be described as follows.

Thus, for example, if the automatic shape control system 29 calls for an increase in mass flow to stand A, a cascade "Up" signal will be applied to all preceding stands—stands A—1, A—2, A—X, A—(X+1),

A—(X+2)

etc. If, during this cascade speed change, one of the motors being accelerated, such as the motor for stand A—(X+2), reaches top speed, a sensor will detect this condition and will remove the cascade "Up" signal from all stands being cascaded. In its place a cascade "Down" signal will be applied to stands A, B, C, etc. to achieve the same relative change in mass flow between stand A and stand A—1.

The cascade speed change will continue at a slow rate until the logic 125 senses a combination of stock dimensions that can be corrected by the automatic shape control system 29 without resorting to further mass flow changes.

Many modifications of the disclosure will be apparent to those skilled in the art for practicing the advantages of the invention which is defined by the appended claims.

I claim:

1. An automatically controlled finishing mill for bar or rod product said mill having successive reducing stands with roll axes oriented at substantially different angles from the roll axes of adjacent stands with the roll separation for each stand independently adjusting during rolling and the drive speed of said stands adjustable to maintain a loop in the product between said stands comprising:

first and second adjacent reducing stands having roll axes relatively oriented at a substantial angle;

first sensor means located following said first reducing stand for sensing a first transverse dimension of said product reduced by said stand;

a first automatic regulator responsive to the value of said first transverse dimension sensed by said first sensor means for adjusting the roll separation in said first reducing stand to maintain a predetermined value for said first transverse dimension;

second sensor means located following said second reducing stand for sensing the transverse dimension of said product reduced by said second stand;

a second automatic regulator responsive to the value of transverse dimension sensed by said second sensor means for adjusting the roll separation in said second reducing stand to maintain a predetermined value for said second transverse dimension;

loop sensing means responsive to the size of said loop of rod between said first and second stands; and means responsive to said loop sensing means for adjusting the relative speed of the rolls between said first and second stands to control the loop size between said stands.

2. Apparatus according to claim 1 and including *an auxiliary sensor means located following one of said reducing stands for sensing the transverse dimension of said product substantially normal to the transverse dimension reduced by said one stand, and* inter-stand control means responsive to said value of transverse dimension sensed by said [second] *auxiliary* sensor means for modifying the control applied to said [first] *one* stand by *the corresponding one of* said [first] automatic [regulator] regulators.

3. Apparatus according to claim 2 in which the control applied to said [first] *one* stand is modified as an inverse function of the transverse dimension sensed by said *auxiliary* [second] sensor means.

4. Apparatus according to claim 3 in which said relative speed is controlled to maintain constant loop height to obtain substantially constant tension in said rod.

5. Apparatus according to claim 1 including means responsive to said loop sensing means for controlling said relative speed to maintain said loop size substantially constant.

6. Apparatus according to claim 1 in which said automatic regulators respond to said sensors subject to the existence of sensed predetermined conditions respecting mass flow rate through said stands.

7. Apparatus according to claim 6 and including:

an auxiliary sensor means located following one of said stands for sensing the transverse dimension of said product substantially normal to the transverse dimension reduced by said one stand, means responsive to both sensor means following said one stand for detecting deviation of both transverse dimensions relative to predetermined values therefor as a measure of mass flow rate through said one stand relative to a predetermined mass flow rate, and means responsive to detection of mass flow rate difference from said predetermined mass flow rate for applying cascade speed change to stands upstream from said one stand to reduce said difference.

8. Apparatus according to claim 7 including:

means responsive to detection of said mass flow rate difference for disabling adjustment of roll separation by said automatic regulators during said difference.

9. Apparatus according to claim 8 including:

means responsive to said *loop* sensing means for controlling said relative speed to maintain said loop size substantially constant.

10. Apparatus according to claim 9 and including interstand control means responsive to said value of transverse dimension sensed by said [second] *auxiliary* sensor means for modifying the control applied to said [first] *one* stand by *the corresponding one of* said [first] automatic [regulator] *regulators.*

11. Apparatus according to claim 5 and including:

load cell means associated with at least one of said stands for sensing instantaneous load separation forces, computer means responsive to signals from load cell means representing said instantaneous load separation forces and quantities representing the mill modulus and the desired roll separation for producing a roll adjusting signal representative of error in said desired roll separation due to deviation of said instantaneous load separation forces from the load forces at which the mill was zeroed, and means for applying said roll adjusting signal to modify the adjustment of roll separation of said automatic regulator for said one stand to correct said error.

12. Apparatus according to claim 11 and including:

an auxiliary sensor means located following one stand for sensing the transverse dimension of said product substantially normal to the transverse dimension reduced by said one stand, means responsive to both sensor means following said one stand for detecting deviation of both transverse dimensions relative to predetermined values therefor as a measure of mass flow rate through said one stand relative to a predetermined mass flow rate, and means responsive to detection of mass flow rate difference from said predetermined mass flow rate for applying cascade speed change to stands upstream from said one stand to reduce said difference.

13. Apparatus according to claim 12 and including:

means responsive to said mass flow rate difference for disabling adjustment of roll separation by said automatic regulators during said difference.

14. Apparatus according to claim 5 and including:

entering sensor means located ahead of at least one of said stands for sensing the entering dimension of said product to be reduced by said one stand, means for comparing the dimension sensed by said entering sensor means and a predetermined value of said entering dimension and producing a predictive signal representative of any difference between said sensed and predetermined values; and means responsive to said predictive signal for modifying adjustment of roll separation by said automatic regulator for said one stand to compensate for said difference, said modifying adjustment being synchronized in relation to the travel of said product from said entering sensor means to a position between said rolls of said one stand.

15. Apparatus according to claim 14 and including:

an auxiliary sensor means located following one stand for sensing the transverse dimension of said product substantially normal to the transverse dimension reduced by said one stand, means responsive to both sensor means followed said one stand for detecting deviation of both transverse dimensions relative to predetermined values therefor as a measure of mass flow rate through said one stand relative to a predetermined mass flow rate, and means responsive to detection of mass flow rate difference from said predetermined mass flow rate for applying cascade speed change to stands upstream from said one stand to reduce said difference.

16. Apparatus according to claim 15 and including:

means responsive to said mass flow rate difference for disabling adjustment of roll separation by said automatic regulators during said difference.

17. Apparatus according to claim 14 and including:

load cell means associated with said one stand for sensing instantaneous load separation forces, computer means responsive to signals from said load cell means representing said instantaneous load separation forces and quantities representing the mill modulus and the desired roll separation for producing a roll adjusting signal representative of error in said desired roll separation due to deviation of said instantaneous load separation forces from the load forces at which the mill was zeroed, and means for applying said roll adjusting signal to modify the adjustment of roll separation by said automatic regulator for said one stand to correct said error.

18. Apparatus according to claim 17 and including:

an auxiliary sensor means located following one stand for sensing the transverse dimension reduced by said one stand, means responsive to both sensor means following said one stand for detecting deviation of both transverse dimensions relative to predetermined values therefor as a measure of mass flow rate through said one stand relative to a predetermined mass flow rate, and means responsive to detection of mass flow rate difference from said predetermined flow rate for applying cascade speed change to stands upstream from said one stand to reduce said difference.

19. Apparatus according to claim 18 and including:

means responsive to said mass flow rate difference for disabling adjustment of roll separation by said automatic regulators during said difference.

References Cited

The following references, cited by the Examiner, are of record in the patented file of this patent or the original patent.

UNITED STATES PATENTS

| | | | |
|---|---|---|---|
| 3,357,217 | 12/1967 | Wallace | 72—16 |
| 3,363,441 | 1/1968 | Smith | 72—8 |

MILTON S. MEHR, Primary Examiner

PO-1050
(5/69)

UNITED STATES PATENT OFFICE
CERTIFICATE OF CORRECTION

Patent No. Re 27,370 Dated May 16, 1972

Inventor(s) John R. McNaugher

It is certified that error appears in the above-identified patent and that said Letters Patent are hereby corrected as shown below:

The following should be inserted after the inventors name and address: --, assignor to Morgan Construction Company, Worcester, Mass., a corporation of Massachusetts--.

Signed and sealed this 20th day of March 1973.

(SEAL)
Attest:

EDWARD M.FLETCHER,JR.
Attesting Officer

ROBERT GOTTSCHALK
Commissioner of Patents